(12) United States Patent
Gay et al.

(10) Patent No.: US 8,753,057 B2
(45) Date of Patent: Jun. 17, 2014

(54) METHOD AND MEMBER FOR TIGHTENING THREADED FASTENERS, AND FIXING AND TIGHTENING DEVICE

(76) Inventors: Pierre Gay, Millery (FR); Rene Hubert, Romagnieu (FR)

( * ) Notice: Subject to any disclaimer, the term of this patent is extended or adjusted under 35 U.S.C. 154(b) by 727 days.

(21) Appl. No.: 12/812,632

(22) PCT Filed: Apr. 24, 2009

(86) PCT No.: PCT/FR2009/050758
§ 371 (c)(1),
(2), (4) Date: Jul. 13, 2010

(87) PCT Pub. No.: WO2009/141545
PCT Pub. Date: Nov. 26, 2009

(65) Prior Publication Data
US 2010/0294086 A1 Nov. 25, 2010

(30) Foreign Application Priority Data

Apr. 30, 2008 (FR) .................................. 08 52942
Nov. 26, 2008 (FR) .................................. 08 06653

(51) Int. Cl.
*F16B 37/08* (2006.01)
(52) U.S. Cl.
USPC .............................................. 411/432; 411/3
(58) Field of Classification Search
USPC .................. 411/432, 1–4, 6, 349, 549
See application file for complete search history.

(56) References Cited

U.S. PATENT DOCUMENTS

| | | | | |
|---|---|---|---|---|
| 2,333,388 A | * | 11/1943 | Poupitch | 411/302 |
| 3,425,314 A | | 2/1969 | Ohlson | |
| 3,667,339 A | * | 6/1972 | Dame | 411/4 |
| 4,068,555 A | * | 1/1978 | Volkman | 411/2 |
| 4,176,582 A | * | 12/1979 | Witte | 411/7 |
| 4,742,735 A | * | 5/1988 | Stencel | 81/121.1 |
| 5,020,949 A | * | 6/1991 | Davidson et al. | 411/7 |
| 5,154,557 A | * | 10/1992 | Houck | 411/7 |
| 5,624,216 A | * | 4/1997 | Detable et al. | 411/5 |
| 5,692,419 A | * | 12/1997 | Binns | 81/124.3 |
| 5,795,116 A | * | 8/1998 | Frank et al. | 411/6 |
| 5,927,917 A | * | 7/1999 | Gibbons | 411/4 |
| 6,322,108 B1 | * | 11/2001 | Riesselmann et al. | 285/3 |
| 6,364,585 B1 | * | 4/2002 | Sakamoto | 411/7 |

(Continued)

FOREIGN PATENT DOCUMENTS

FR 2791404 9/2000

*Primary Examiner* — Gary Estremsky
(74) *Attorney, Agent, or Firm* — Dowell & Dowell, P.C.

(57) ABSTRACT

This method of tightening a threaded fastener (6) to a predetermined torque comprises steps in which: axial and rotational coupling is begun, by surface shrinking to a tight fit, of the threaded fastener (6) to a tightening member (2) capable of turning the threaded fastener (6) and thereby tightening it, the tightening member (2) and the threaded fastener (6) being able, from an initial coupled configuration between the tightening member and the threaded fastener, to remain rotationally coupled at a rotary drive torque, transmitted by the tightening member to the threaded fastener, that is less than the predetermined tightening torque, and to be rotationally decoupled from each other at a rotary drive torque, transmitted by the tightening member to the threaded fastener, that is equal to the predetermined tightening torque; and from this initial coupled configuration, a rotary movement is applied to the tightening member (2) up to a rotary drive torque, transmitted by the tightening member (2) to the threaded fastener (6), that causes rotational decoupling of the tightening member (2) from the threaded fastener (6).

12 Claims, 8 Drawing Sheets

(56) References Cited

U.S. PATENT DOCUMENTS

| | | | |
|---|---|---|---|
| 6,739,631 B2 * | 5/2004 | Smith et al. | 285/337 |
| 6,802,680 B1 * | 10/2004 | Rubenstein | 411/7 |
| 7,011,481 B2 * | 3/2006 | Winker | 411/277 |
| 7,029,216 B2 * | 4/2006 | McKay | 411/6 |

* cited by examiner

Fig.22 ary and tightening
METHOD AND MEMBER FOR TIGHTENING THREADED FASTENERS, AND FIXING AND TIGHTENING DEVICE

BACKGROUND OF THE INVENTION

1. Field of the Invention

The present invention relates to a method and to a member for tightening one or more screw-fastener elements, and also to a fastener and tightening device enabling the method to be performed.

2. Brief Description of the Related Art

Controlling the tightening of a screw-fastener element, such as a nut, a bolt, or a stud, conventionally relies on determining the tightening torque to be applied to the screw-fastener element. In the usual approach, applying this tightening torque requires a calibrated tightening member to be used, and also requires the tightening torque for application to be determined. This determination may be performed on the basis of the coefficient of friction between the threads, which is data provided by the screw-fastener manufacturer. Such tightening to torque therefore requires action to be performed by a qualified operator.

It is also known to make use of standardized tightening means for transmitting a predetermined tightening toque to a screw-fastener element, said means being designed to transmit destructive forces to the screw-fastener element when the predetermined torque is reached. In such devices, once the screw-fastener element has been tightened, it is damaged and cannot be tightened again in the event of variations in the tightening, as might result for example from vibration or creep of the material on which the screw-fastener element is mounted, when the material is concrete or wood.

U.S. Pat. No. 3,425,314 discloses a fastener and tightening device that comprises a nut and a ring for turning said nut. The ring is constituted by a succession of tubular portions that are separated in pairs by slits. When the tightening torque between the ring and the nut reaches a maximum value, the above-mentioned portions flex outwards under the action of a ratchet defined externally by the nut. Thus, the operation of that device relies solely on the capacity of portions of its ring to flex, thus preventing the delivery of a high level of tightening force and preventing an accurate transmission of force to the vertices of the ratchet, which are entirely unsuitable for implementing tight-fit interference.

U.S. Pat. No. 4,176,582 and FR-A-2 791 404 disclose fastener and tightening devices including a member for turning a screw-fastener element. That member is designed to transmit limited torque because its material is capable of deforming easily. Similarly, U.S. Pat. No. 6,364,585 discloses a tightening member described as being a resin endpiece, that is suitable for deforming elastically in its material so as to transmit a torque of limited magnitude to a screw-fastener element. Thus, the devices proposed in those documents are structurally incapable of delivering a high level of tightening or of transmitting an accurate force.

SUMMARY OF THE INVENTION

The object of the invention is to propose a method and a member for tightening that guarantee reliable tightening of a screw-fastener element with a predetermined tightening torque, and that make it possible to perform subsequent tightening operations on the screw-fastener element after a first tightening operation, with performance of the method and use of the member not requiring action on the part of qualified personnel.

To this end, the invention provides a method and a member for tightening a screw-fastener element with a predetermined tightening torque, as defined respectively in claims 1 and 5.

Thus, in the invention, co-operation by interference between two parts designates co-operation between surfaces in a tight-fit between those two parts, with one of them engaged, at least in part, in the other. The tolerances, adjustments, and stresses that are involved during such tight-fit surface interference are essential to the invention in that, by complying with these tolerances, adjustments, and stresses, the invention presents the remarkable advantage of enabling tightening to be provided that is sufficiently powerful and of enabling an accurate force to be transmitted.

In addition, in the meaning of the invention, two parts are constrained to turn together when turning one of the parts causes the other part to turn in the same direction, with or without relative slip between the parts. In particular, two parts that are constrained to turn together may have speeds of rotation that are different as a result of one of the parts slipping relative to the other. Furthermore, two parts that are initially constrained to turn together are subsequently released to turn relative to each other in the meaning of the invention from the moment when, for any additional turning applied to one of the parts, the other part remains stationary.

BRIEF DESCRIPTION OF THE DRAWINGS

The characteristics and advantages of the invention appear from the following description of four embodiments of a method and a device of the invention for fastening and tightening, given purely by way of example, and made with reference to the accompanying drawings, in which.

DESCRIPTION OF THE PREFERRED EMBODIMENTS

Figure 1:
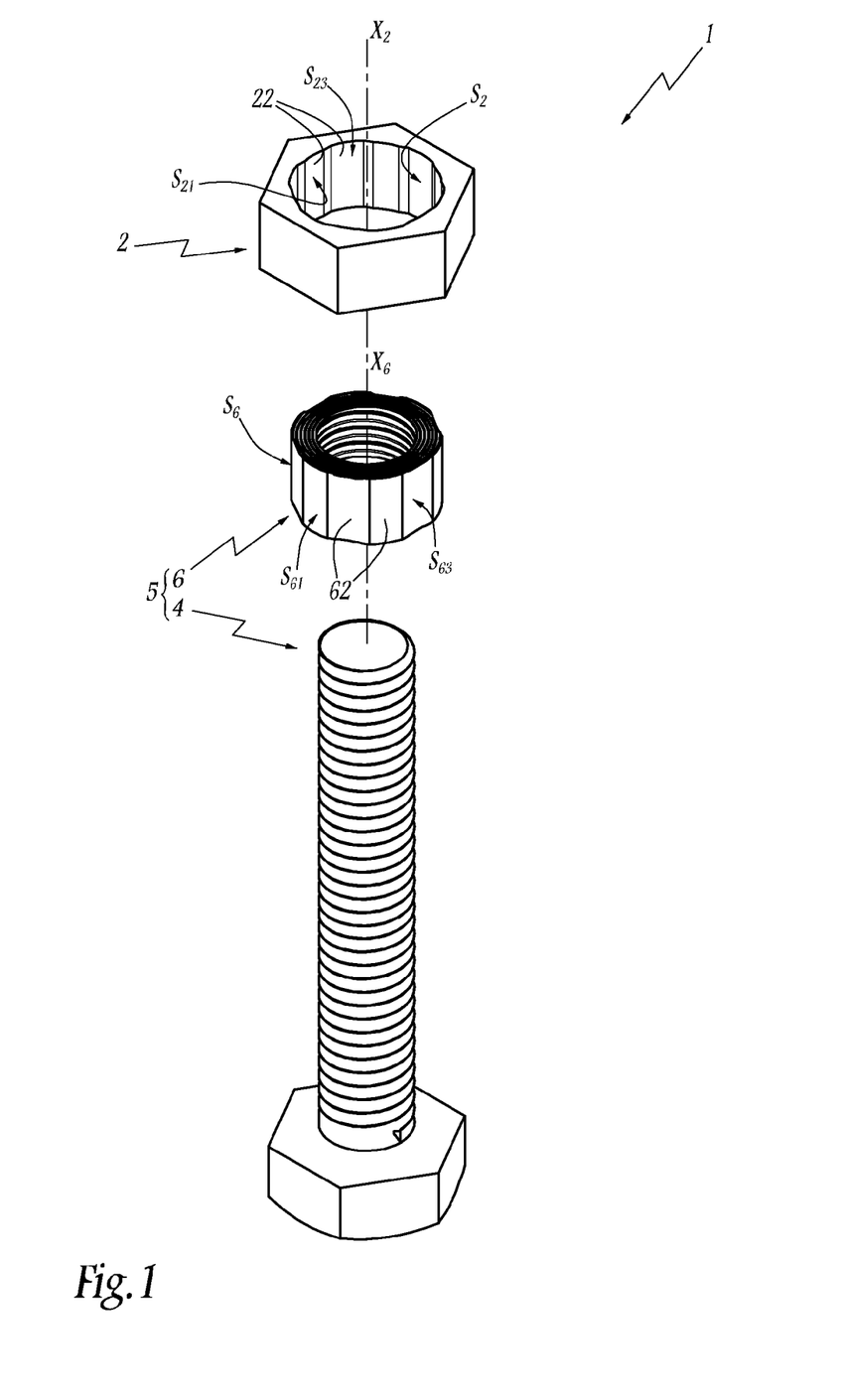
FIG. 1 is an exploded perspective view of a fastener and tightening device in accordance with a first embodiment of the invention, prior to tightening a screw-fastener element by means of a tightening member.
Figure 2:
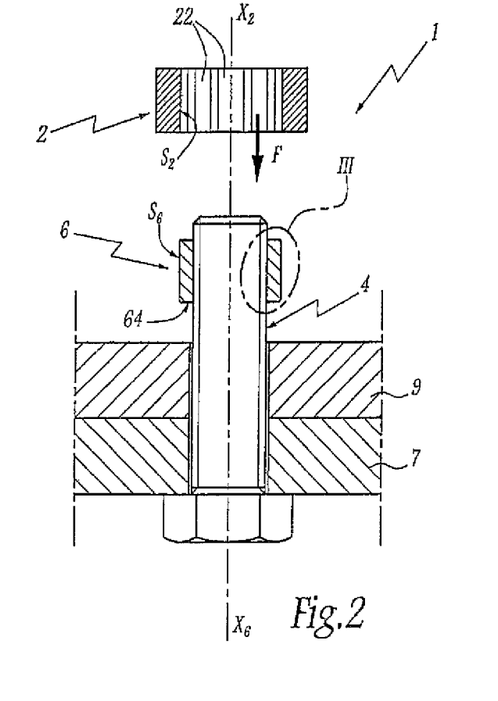
FIG. 2 is a longitudinal section of the FIG. 1 fastener and tightening device in use for assembling together two parts.

FIG. 2 shows two parts 7 and 9 that are to be assembled together by means of a fastener and tightening device 1 in accordance with the invention. As shown in FIG. 1, the device 1 comprises a nut-and-bolt type connection 5 comprising a nut 6 and a bolt 4, together with a ring or hoop 2 for tightening the connection 5. The tightening ring 2 is suitable for being engaged around the nut 6 and it presents an inside peripheral surface $S_2$ that is substantially complementary to an outside peripheral surface $S_6$ of the nut 6. The ring 2 and the nut 6 are rigid parts capable of withstanding locally and overall the interference produced by the tight fit obtained between them when implementing the tightening means. As explained in detail below, this co-operation by interference corresponds to co-operation over a tight-fit surface area that can be compared with the behavior of H7p6 or H6p5 type fits.

The tightening ring 2 includes internal peripheral splines 22 complementary to external peripheral splines 62 of the nut 6. The elements 2 and 6 are thus suitable for being engaged one in the other by putting their respective splines into correspondence, with the central axes $X_2$ and $X_6$ to the elements 2 and 6 then coinciding. In the meaning of the invention, a configuration in which the splines 22 of the tightening ring 2 are in correspondence with the splines 62 of the nut 6 is a configuration in which the surface portions $S_{21}$ projecting from the splined inside surface $S_2$ of the tightening ring 2 are placed in register with setback surface portions $S_{63}$ in the splined outside surface $S_6$ of the ring 6, while the setback surfaces $S_{23}$ of the surface $S_2$ of the tightening ring 2 are placed in register with surface portions $S_{62}$ projecting from the surface $S_6$ of the nut 6. Such a configuration of the splines 22 and 62 in correspondence enables the tightening ring 2 and the nut 6 to be both mutually engaged and separated.

Figure 4:
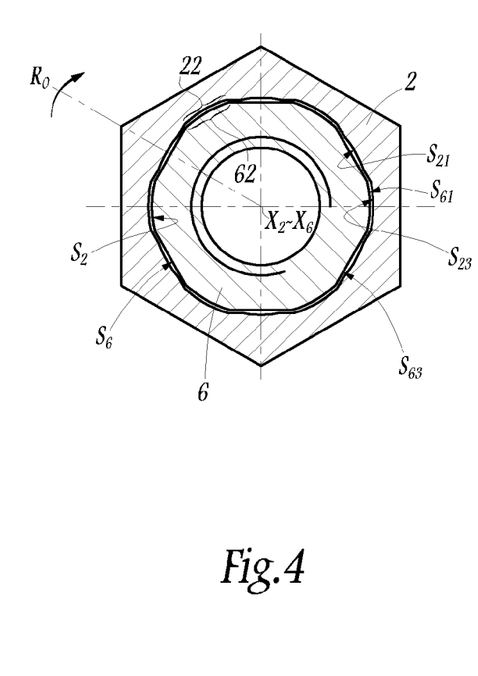
FIG. 4 is a cross-section view of the screw-fastener element and the tightening member of FIGS. 1 and 2, during a first step of tightening the screw-fastener element.
Figure 5:
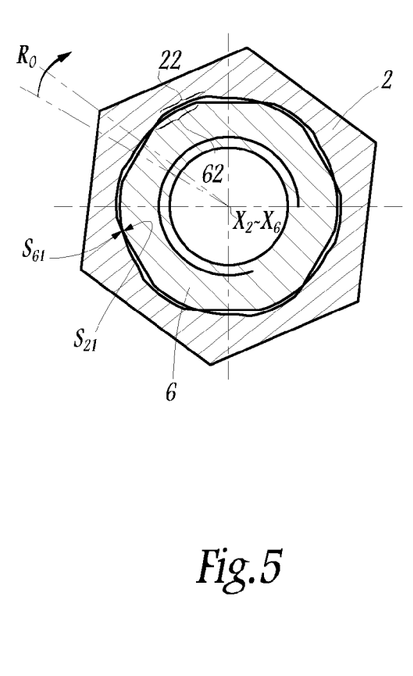
FIG. 5 is a section analogous to FIG. 4, during a second step of tightening the screw-fastener element.
Figure 6:
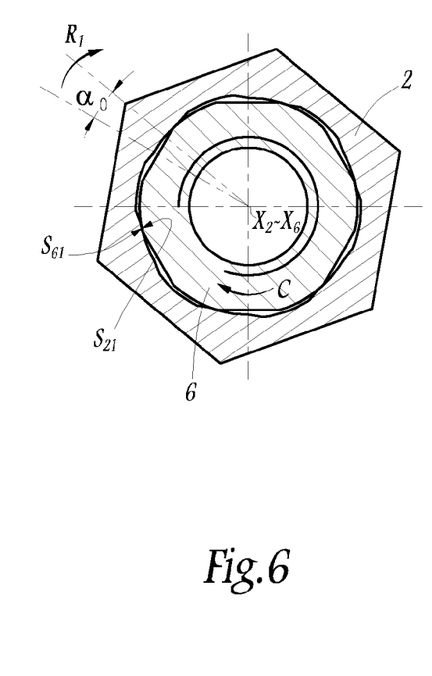
FIG. 6 is a section analogous to FIG. 4, during a third step of tightening the screw-fastener element.
Figure 7:
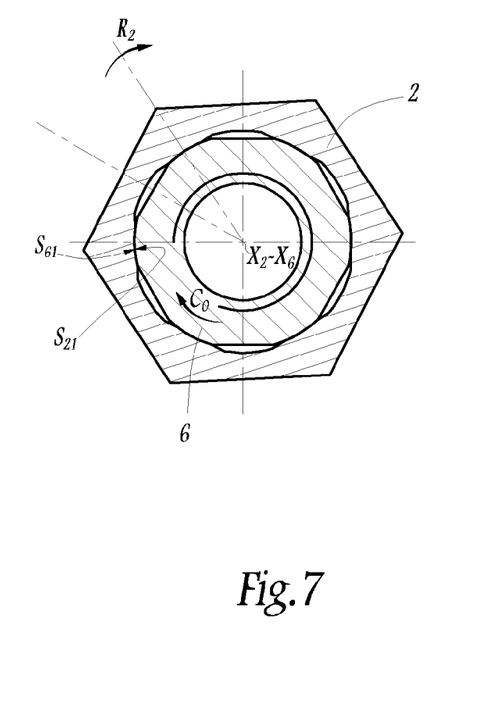
FIG. 7 is a section analogous to FIG. 4, during a fourth step of tightening the screw-fastener element.
Figure 8:
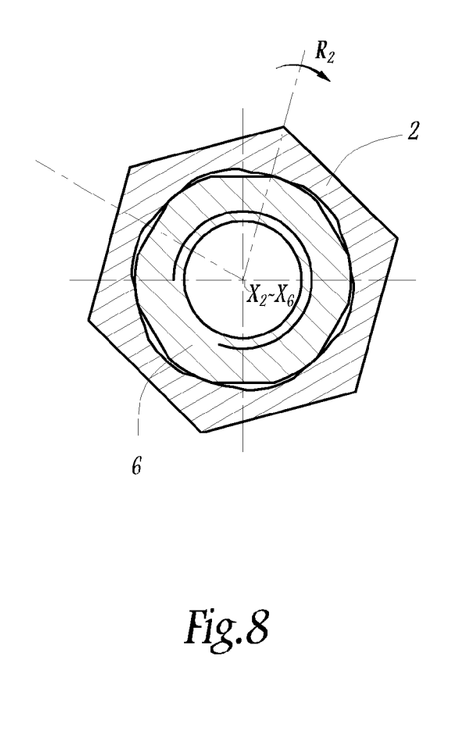
FIG. 8 is a section analogous to FIG. 4, during a fifth step of tightening the screw-fastener element.

Starting from a configuration in which the tightening ring 2 is engaged relative to the nut 6, as shown in FIG. 4, the tightening ring 2 is suitable for being turned about its central axis $X_2$, as represented by arrows $R_0$, $R_1$, and $R_2$ in FIGS. 4 to 8, so as to induce tightening on the nut 6, i.e. on the screw-fastened connection 5. By a first turning movement $R_0$ through an angle $\alpha_0$, axial and rotary holding is initiated by interference between the tightening ring 2 and the nut 6. The turning movement $R_0$ brings each surface portion $S_{21}$ projecting from the tightening ring 2 into contact with a surface portion $S_{61}$ projecting from the nut 6, as shown in FIGS. 5 and 6. Each surface $S_{21}$ is adapted to co-operate by interference with a surface $S_{61}$, such that starting from the initial configuration where the tightening ring 2 is held in rotation relative to the nut 6, the tightening ring 2 is suitable, by making a turning movement $R_1$, for entraining the nut 6 to turn about its central axis $X_6$. More precisely, moving the tightening ring 2 through a turn $R_1$ causes the nut 6 to turn in the same direction, with the speeds of rotation of the tightening ring 2 and the nut 6 being different because of relative slip between them as a function of the force transmitted by the nut 6 and bolt 4 system to the parts 7 and 9. In particular, the tightening ring 2 is suitable for exerting on the nut 6 both a radial force and an axial force enabling it to be tightened without possibility of release during this tightening. Advantageously, the surface portions $S_{21}$ and $S_{61}$ correspond to surfaces in tangential or quasi-tangential contact in order to eliminate edges that could lead to seizing.

Starting from the initial configuration in which the tightening ring 2 is held relative to the nut 6, as shown in FIG. 6, the friction force between the surfaces $S_{21}$ and $S_{61}$ is designed to increase until it reaches a maximum friction force, beyond which there is no longer any entrainment by friction between the surfaces $S_{21}$ and $S_{61}$. This maximum friction force is adapted to be equal to the force exerted by the surfaces $S_{21}$ on the surfaces $S_{61}$ when the turning torque C transmitted by the tightening ring 2 to the nut 6 starting from the initial held-together configuration of FIG. 6 is equal to a predetermined tightening torque $C_0$ for applying to the nut 6. In this way, starting from their initial held-together configuration, the tightening ring 2 of the nut 6 are suitable for remaining constrained together in rotation for a turning torque C that is less than the tightening torque $C_0$ and for being released relative to each other in rotation for a turning torque C that is equal to the tightening force $C_0$. In order to control the friction force exerted at the interface between the surfaces $S_{21}$ and $S_{61}$, these surfaces are advantageously provided with a surface coating, such as a friction lining, so that the coefficient of friction between these surfaces is well determined. In particularly advantageous manner, this surface coating is adapted to change in appearance while the nut 6 is being tightened by means of the tightening ring 2. This surface coating may also perform other known advantageous functions, e.g. an anti-corrosion function.

Figure 3:
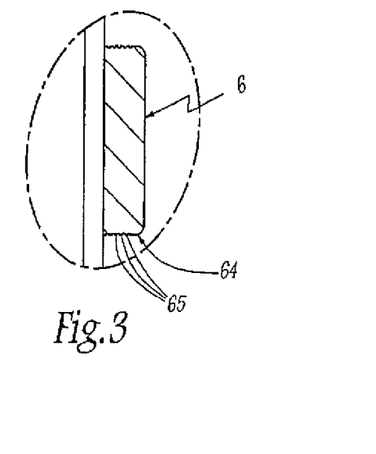
FIG. 3 is a view on a larger scale of a detail III of FIG. 2.

As can be seen more particularly in FIG. 3, the nut 6 includes circular ribs 65 centered on the axis $X_6$ on its face 64 that is to be brought to bear against one of the parts for assembly. By way of example, the ribs 65 may be in the form of a screw thread with its thread tightening towards the axis $X_6$ in the tightening direction. These ribs 65 seek to limit radial deformation of the nut 6 when subjected to radial and axial reactions from the threads of the bolts 4 and of the bearing part 9 during tightening. The threads in contact between the nut 6 and the bolt 4 are thus stressed more uniformly during tightening. In addition, control over the radial deformation of the nut 6 is necessary in order to control the interference contact between the surfaces $S_{21}$ and $S_{61}$, thereby enabling the nut 6 to be accurately tightened with the predetermined tightening torque $C_0$. The ribs 65 also contribute to maintaining the tightening of the nut 6 at the torque $C_0$, by an anti-loosening effect.

A method of tightening the nut 6 by means of the tightening ring 2 comprises steps such as those described below.

Initially, the tightening ring 2 is engaged relative to the nut 6 for tightening, and as represented by arrow F in FIG. 2, by putting the splines 22 of the tightening ring 2 into correspondence with the splines 62 of the nut 6. The elements 2 and 6 are then in the engaged configuration as shown in FIG. 4.

Starting from this engaged configuration, a turning movement $R_0$ is imparted to the tightening ring 2 about its axis $X_2$. The tightening ring 2 is thus caused to pivot relative to the nut 6 until it reaches an initial configuration in which it is held both axially and in rotation relative to the nut 6, as shown in FIG. 6, in which configuration each surface portion $S_{21}$ projecting from the tightening ring 2 co-operates with interference with each surface portion $S_{61}$ projecting from the nut 6. The tightening ring 2 is then suitable, on being turned, for transmitting a rotary drive torque C to the nut in order to tighten it.

The polygonal outside surface, here a hexagonal surface, of the tightening ring 2 enables it to co-operate with a wrench of the kind as conventionally used with polygonal nuts. In a variant, any known means for transmitting tightening torque may be used for turning the tightening ring 2.

Rotary drive of the tightening ring 2 is then continued by turning through $R_1$, in the same direction as the turning movement $R_0$, so as to reach a rotary drive torque C that is transmitted by friction from the tightening ring 2 to the nut 6, thereby enabling the tightening ring 2 to be released in rotation relative to the nut 6. This release of the tightening ring 2 in rotation relative to the nut 6 is made manifest by the fact that the nut 6 stops moving while the tightening ring 2 continues to be driven in rotation. The tightening ring 2 then makes available a tightening torque C that is greater than $C_0$. The tightening ring 2 becoming released in rotation relative to the nut 6 indicates that the tightening operation has finished and that the predetermined tightening torque $C_0$ has indeed been transmitted to the nut 6.

Figure 9:
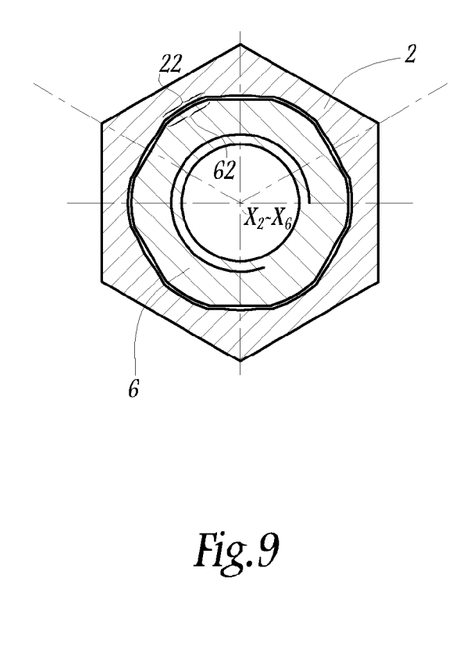
FIG. 9 is a section analogous to FIG. 4, showing the screw-fastener element in the tightened configuration.

From this configuration in which the tightening ring 2 is free to turn, the tightening ring 2 is caused to perform a turning movement $R_2$ about its axis $X_2$ while the nut 6 remains stationary in rotation. The turning movement $R_2$ is continued until the elements 2 and 6 are once more in a mutually-engaged configuration. More precisely, this new mutually-engaged configuration, as shown in FIG. 9, corresponds to a configuration of the elements 2 and 6 in which the splines 22 and 62 correspond once more, with the tightening ring 2 having pivoted relative to the nut 6 so as to put each of its splines 22 into engagement with the following splines 62 of the nut 6 relative to the starting mutually-engaged configuration.

Given the relative characteristics of the tightening ring 2 and of the nut 6, this arrival in a new mutually-engaged configuration indicates that the predetermined tightening torque $C_0$ has been applied by the tightening ring 2 to the nut 6. Advantageously, an operator observing that the tightening ring 2 has turned by this amount relative to the nut 6, i.e. by an amount enabling the elements 2 and 6 to return to a mutually-engaged configuration, constitutes a step of monitoring and confirming the tightening in the context of the method of tightening the nut 6 by means of the tightening ring 2.

The tightening ring 2 is then caused to slide axially relative to the nut 6 so as to separate the two elements 2 and 6. In particularly advantageous manner, this relative axial sliding of the elements 2 and 6 is possible only in the mutually-engaged configuration of FIG. 9, such that the tightening cannot be interrupted until the tightening torque $C_0$ has been achieved. The screw-fastened connection 5 is then tightened and the parts 7 and 9 are assembled together.

As can be seen from the above-described steps of the tightening method, the contact area between the tightening ring 2 and the nut 6 varies during tightening. This contact area is zero or at a minimum in the initial mutually-engaged configuration of the ring 2 and the nut 6, and then increases during the turning movements $R_0$ and $R_1$ of the tightening ring 2, and finally decreases during the turning movement $R_2$ of the tightening ring 2, so as to become once more zero or at a minimum so as to enable the tightening ring 2 to be separated from the nut 6.

Figure 10:
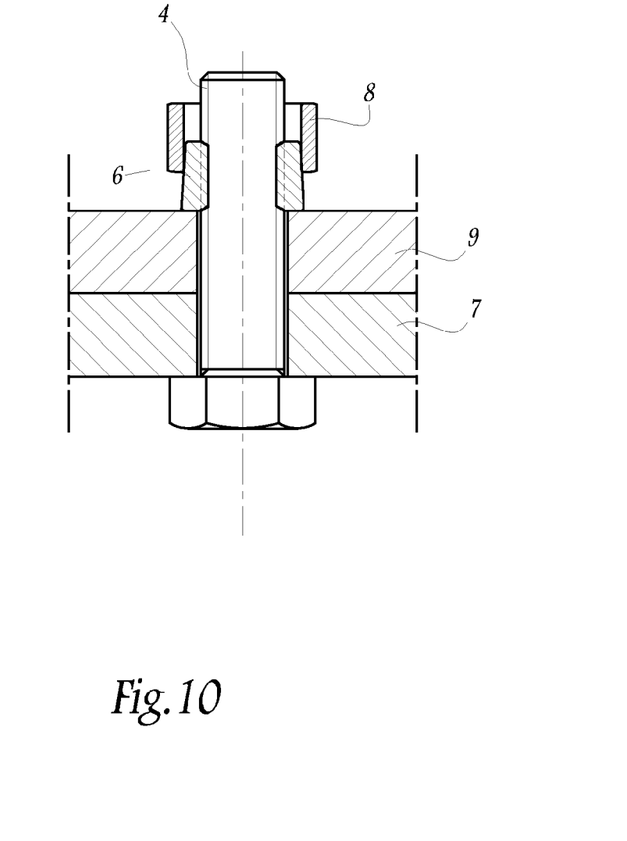
FIG. 10 is a section analogous to FIG. 2, during a step of checking the tightening force transmitted by the tightening member of the screw-fastener element at the end of tightening.
Figure 11:
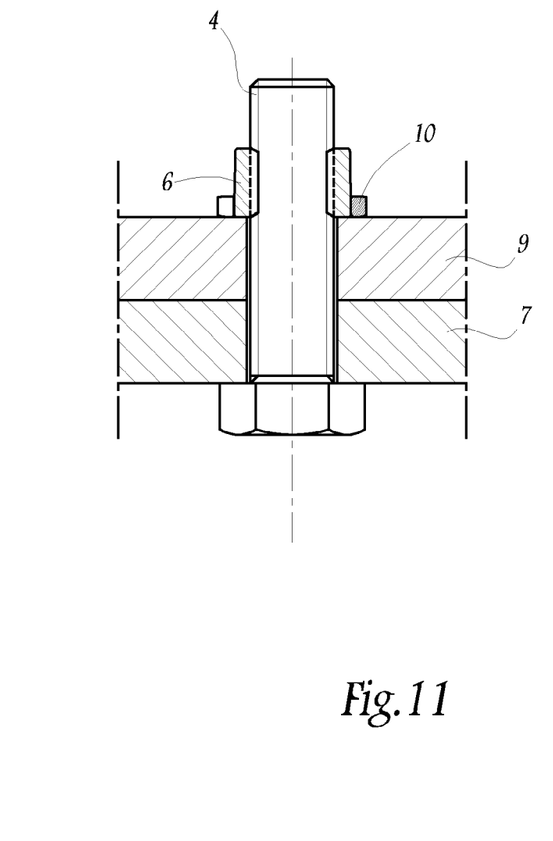
FIG. 11 is a section analogous to FIG. 2, during another step of checking the tightening force transmitted by the tightening member of the screw-fastener element at the end of tightening.

As shown in FIGS. 10 and 11, the fastener and tightening device 1 in accordance with this first embodiment of the invention may also include means for checking the tightening force delivered at the end of tightening by the nut 6 and bolt 4 system to the assembled-together parts 7 and 9. In particular, as shown in FIG. 10, the device 1 includes a calibrated checking ring 8 of radial dimensions that are adapted to correspond to the radial dimensions of the nut 6 when it delivers a desired predetermined tightening force to the parts 7 and 9. In a variant, the device 1 may include a checking ring 10, as shown in FIG. 11, that is premounted around the nut 6 before it is tightened and that is adapted to break under the effect of the nut 6 being deformed radially by an amount that corresponds to the nut 6 delivering a desired predetermined tightening force to the parts 7 and 9. Other means for checking the tightening force delivered by the nut 6, e.g. involving evaluating the radial deformation of the nut 6, may also be used. As non-limiting examples, such checking means may comprise a checking ring premounted around the nut 6 before it is tightened and that is adapted to be prevented from moving under the effect of the nut 6 being radially deformed by an amount that corresponds to the nut 6 delivering a desired predetermined tightening force on the parts 7 and 9, or else of a tightening ring that is suitable for breaking under the effect of radial deformation of the nut 6 that corresponds to the parts 7 and 9 being subjected to a desired predetermined tightening force.

Figures 12, 13:
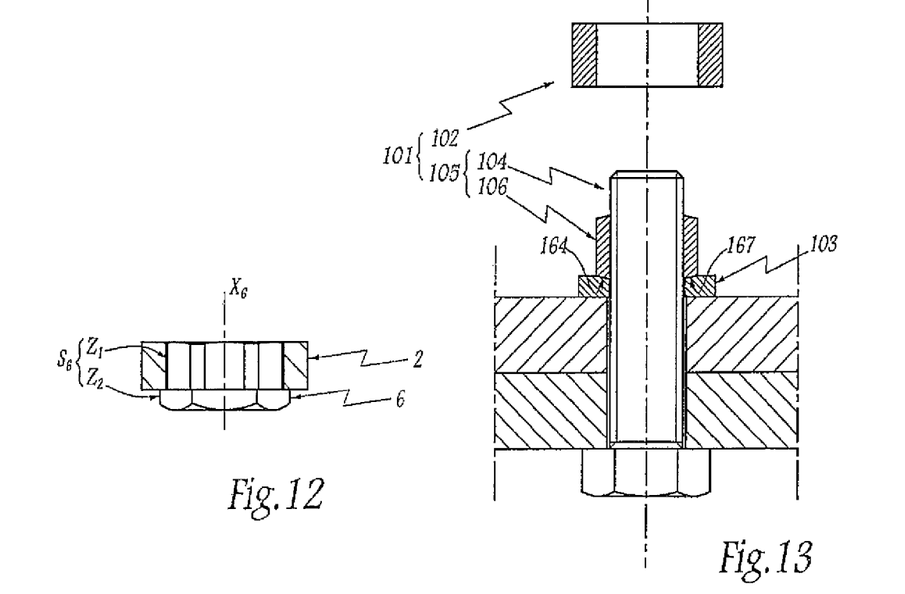
FIG. 12 is a section on a larger scale of a variant of the screw-fastener element of the FIG. 1 fastener and tightening device, the variant element being shown co-operating with a tightening member.
FIG. 13 is a section analogous to FIG. 2 for a fastener and tightening device in accordance with a second embodiment of the invention.

Advantageously, as shown in FIG. 12, the outside peripheral surface $S_6$ of the nut 6 of a fastener and tightening device 1 in accordance with the invention may also include two superposed zones $Z_1$ and $Z_2$ that serve respectively to drive the nut 6 in rotation by means of the tightening ring 2, and to drive the nut 6 in rotation by means of some other drive member, such as a conventional wrench for tightening polygonal nuts. Such a structure for the nut 6 serves to facilitate prior connection of and removal thereof in the event of disassembly as compared with acting via the tightening ring 2.

In the second embodiment shown in FIG. 13, elements that are analogous to those of the first embodiment are given references that are identical, plus 100. The device 101 in this second embodiment comprises, in analogous manner to the first embodiment, a nut-and-bolt type connection 105 comprising a nut 106 and a bolt 104, together with a ring or hoop 102 for tightening the connection 105. The device 101 differs from the device 1 of the first embodiment solely in that the bearing face 164 of the nut 106 presents a conical chamfer 167 for co-operating with a washer 103. The conical chamfer 167 of the bearing face 164 acts in a manner analogous to the ribs 65 of the first embodiment to limit radial deformation of the nut 106 while it is being tightened by means of the ring 102. Thus, the contacting threads between the nut 106 and the screw 104 are stressed more uniformly during tightening, and the interference contact between the surfaces of the tightening ring 102 and of the nut 106 is well controlled, thereby guaranteeing that the nut 106 is tightened with the predetermined tightening torque $C_0$. In addition, a measurement of the deformation of the washer 103 as occurs during tightening provides advantageous means for verifying the force that has been applied at the end of tightening.

Figures 14, 15:
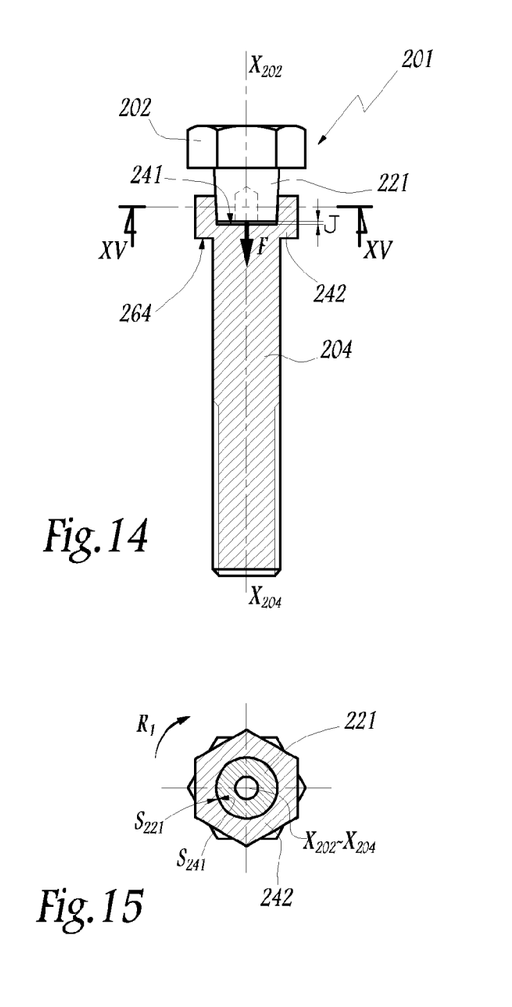
FIG. 14 is a longitudinal section of a fastener and tightening device in accordance with a third embodiment of the invention prior to tightening a screw-fastener element by means of a tightening member.
FIG. 15 is a section on XV-XV of FIG. 14 while tightening the screw-fastener element.

In the third embodiment shown in FIGS. 14 and 15, elements analogous to those of the first embodiment are given identical references plus 200. The device 201 in accordance with this third embodiment comprises a tightening member 202 and a bolt 204 having a head 242 that defines a face 264 that is to come to bear against a part. In its head 242, the bolt 204 includes a housing 241 suitable for receiving a male portion 221 of the tightening member 202. As shown in FIG. 14, the outside peripheral surface $S_{221}$ of the male portion 221 is frustoconical. This surface $S_{221}$ is designed to co-operate by interference with the inside peripheral surface $S_{241}$ of the housing 241, which is likewise frustoconical. More precisely, the male portion 221 is suitable for being engaged as a force-fit in the housing 241 so as to occupy the clearance J that is visible in FIG. 14, with the central axes $X_{202}$ and $X_{204}$ of the tightening member 202 and of the bolt 204 then coinciding. When the male portion 221 is engaged as a force-fit in the housing 241, as shown in FIG. 15, the tightening member 202 and the bolt 204 are held together both axially and in rotation by co-operation by interference between the surfaces $S_{221}$ and $S_{241}$. Thus, the force-fit of the male portion 221 in the housing 241 initiates axial and rotary holding together of the tightening member 202 and of the bolt 204 by interference. From this initial held-together configuration, the tightening member 202 is suitable by a turning movement $R_1$ for driving the screw 204 in rotation about its central axis $X_{204}$. More precisely, the turning movement $R_1$ of the tightening member 202 causes the screw 204 to turn in the same direction, without relative slip between them. In particular, the tightening member 202 is suitable for exerting a force on the bolt 204 that is both radial and axial, thereby enabling it being tightened.

The maximum friction force between the surfaces $S_{221}$ and $S_{241}$, i.e. the force beyond which there is no longer any friction drive between the surfaces $S_{221}$ and $S_{241}$, is adapted to be equal to the force exerted by the surface $S_{221}$ on the surface $S_{241}$ when the rotary drive torque C transmitted by the tightening member 202 of the bolt 204 from their initial held-together configuration is equal to a predetermined tightening torque $C_0$ that is to be applied to the bolt 204. Thus, the tightening member 202 and the bolt 204 are suitable, starting from their initial held-together configuration, for remaining constrained to turn together when subjected to a turning drive force C that is less than the tightening torque $C_0$ and to slip relative to each other, i.e. to be released in turning relative to each other, for a turning drive torque C that is equal to the tightening torque $C_0$. As in the above-described embodiments, the surfaces $S_{221}$ and $S_{241}$ are advantageously provided with a surface coating, such as a friction lining, so as to obtain a coefficient of friction and a friction force at the interface between these surfaces that are well determined.

A method of tightening the bolt 204 by means of the tightening member 202 comprises steps as described below.

To begin with, the tightening member 202 is caused to be held both axially and in rotation relative to the bolt 204 by engaging the male portion 221 of the tightening member 202 as a force-fit in the housing 241 of the bolt 204, i.e. by occupying the clearance J as represented by arrow F in FIG. 14.

From this initial held-together configuration, a turning movement $R_1$ is imparted to the tightening member 202 so as to reach a turning drive torque that is transmitted by the tightening member 202 to the bolt 204 that enables them to slip relative to each other, i.e. that enables the tightening member 202 to be released in rotation relative to the bolt 204.

Because of the relative characteristics of the tightening member 202 and of the bolt 204, the possibility of slip between the tightening member 202 and the bolt 204 is a sign that the predetermined tightening torque $C_0$ has been applied by the tightening member 202 to the bolt 204. An operator observing this possibility for the tightening member 202 to slip relative to the screw 204 constitutes a step of checking and confirming the tightening in the context of the method of tightening the bolt 204 by means of the tightening member 202. The male portion 221 is then caused to slide away from the housing 241 so as to separate the tightening member 202 from the bolt 204. As in the above embodiment, this sliding of the male portion 221 relative to the housing 241 from a configuration in which the clearance J has been occupied is possible only when the tightening torque $C_0$ has been applied to the bolt 204, in other words the tightening of the bolt 204 cannot be interrupted until the predetermined tightening torque $C_0$ has been obtained.

Figure 16:
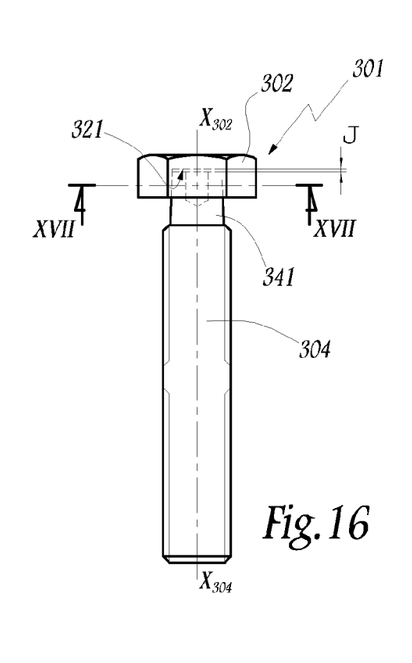
FIG. 16 is a longitudinal section of a fastener and tightening device in accordance with a fourth embodiment of the invention, prior to tightening a screw-fastener element by means of the tightening member.
Figure 17:
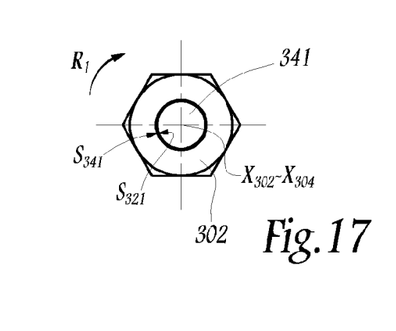
FIG. 17 is a section on line XVII-XVII of FIG. 16 while tightening the screw-fastener element.

In the fourth embodiment shown in FIGS. 16 and 17, elements analogous to those of the first embodiment carry identical references plus 300. The device 301 in accordance with the fourth embodiment comprises a stud 304 and a tightening member 302. The tightening member 302 has a female housing 321 suitable for receiving a male end 341 of the stud 304. As shown in FIG. 16, the inside peripheral surface $S_{321}$ of the female housing 321 is frustoconical, as is the outside peripheral surface $S_{341}$ of the end 341. The surfaces $S_{321}$ and $S_{341}$ are designed to co-operate by interference. More precisely, in a manner analogous to the third embodiment, the male end 341 of the stud 304 is suitable for being engaged as a force-fit in the housing 321 so as to occupy the clearance J shown in FIG. 16, the central axes $X_{302}$ and $X_{304}$ of the tightening member 302 and of the stud 304 then coinciding. When the male end 341 is engaged as a force-fit in the housing 321, as shown in FIG. 17, the tightening member 302 and the stud 304 are held together both axially and in rotation by the co-operation by interference between the surfaces $S_{321}$ and $S_{341}$. As a result of this force-fit of the male end 341 in the housing 321, the tightening member 302 and the stud 304 are held together both axially and in rotation by interference.

Starting from this held-together configuration, the tightening member 302 is suitable, by a turning movement $R_1$, for driving the stud 304 in rotation about its central axis $X_{304}$. More precisely, the turning movement $R_1$ of the tightening member 302 causes the stud 304 to turn in the same direction without relative sliding between them. Furthermore, in accordance with the invention, the maximum friction force between the surfaces $S_{321}$ and $S_{341}$, i.e. the force beyond which there is no longer friction drive between the surfaces $S_{321}$ and $S_{341}$, is adapted to be equal to the force exerted by the surface $S_{321}$ on the surface $S_{341}$ when the rotary drive force C transmitted by the tightening member 302 to the stud 304 from their initial held-together configuration is equal to a predetermined tightening force $C_0$ for application to the stud 304. The tightening member 302 and the stud 304 are thus suitable, starting from their initial held-together configuration, for remaining constrained together in rotation for a rotary drive torque that is less than the tightening torque $C_0$ and for being movable in slip relative to each other, i.e. for being released in rotation, by a rotary drive torque C that is equal to the tightening torque $C_0$. In particular, in the context of a method of tightening the stud 304 by means of the tightening member 302, which method is performed in manner analogous to the method described for the third embodiment, the tightening member 302 can be separated from the stud 304 from a configuration in which the clearance J is occupied, only once the tightening torque $C_0$ has been applied to the stud 304, and as a result the tightening of the stud 304 cannot be interrupted until the predetermined tightening torque $C_0$ has been obtained.

Figure 18:
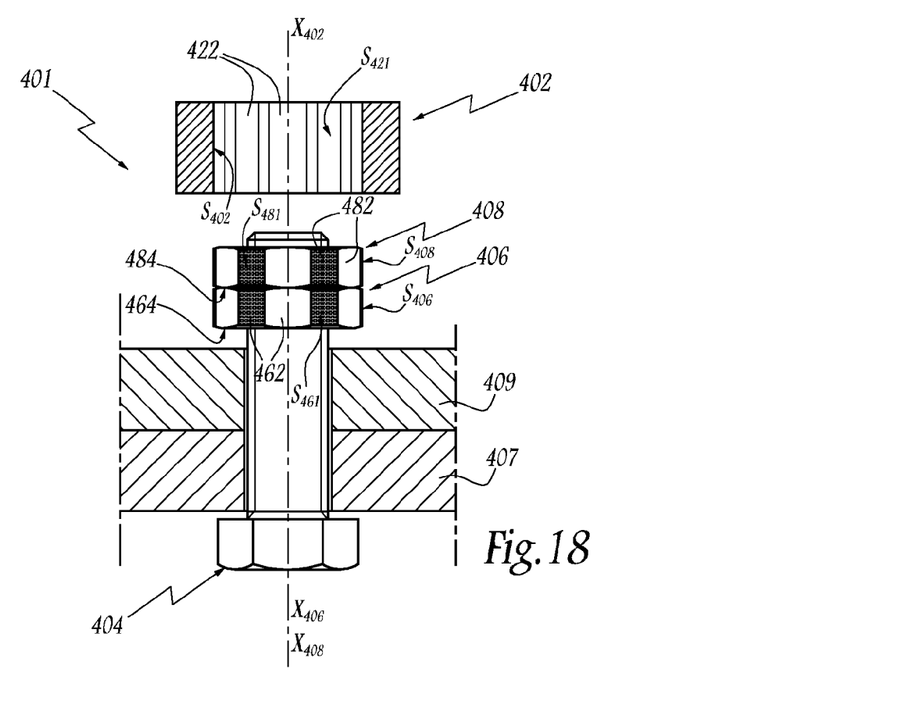
FIG. 18 is a longitudinal section of a fastener and tightening device in accordance with a fifth embodiment of the invention, prior to simultaneous tightening of two screw-fastener elements by means of a tightening member.
Figure 19:
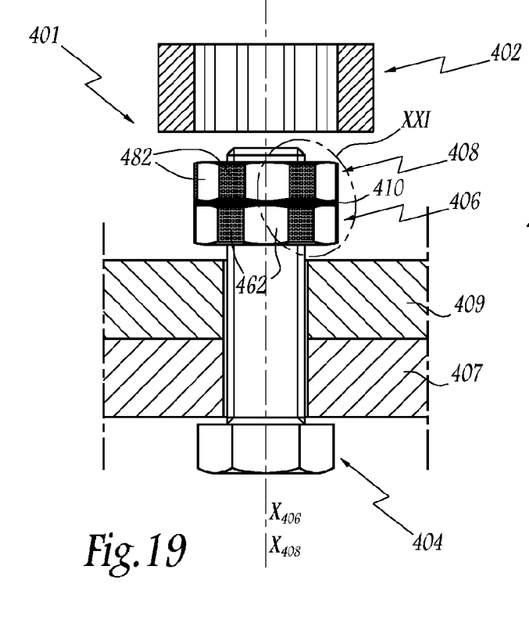
FIG. 19 is a section analogous to FIG. 18 for a fastener and tightening device in accordance with a sixth embodiment of the invention prior to simultaneous tightening of two screw-fastener elements by means of a tightening member.
Figure 20:
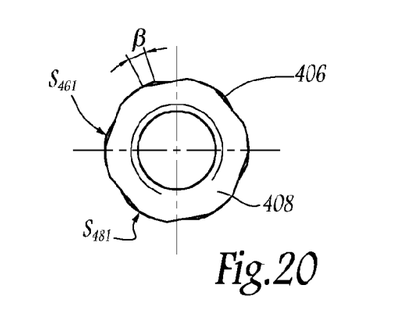
FIG. 20 is a plan view of the screw-fastener elements of FIG. 19.
Figure 21:
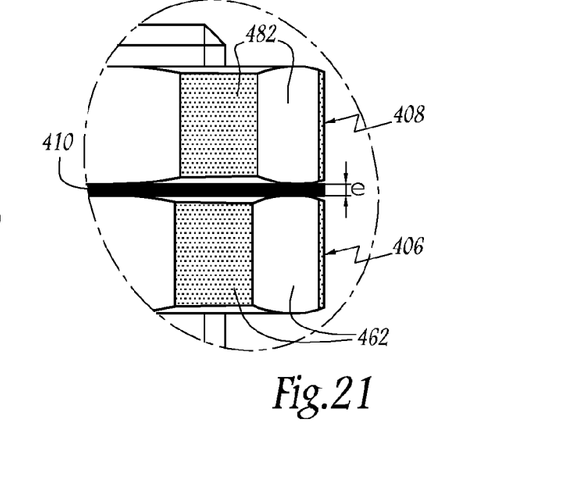
FIG. 21 is a view on a larger scale showing detail XXI of FIG. 19.
Figure 22:
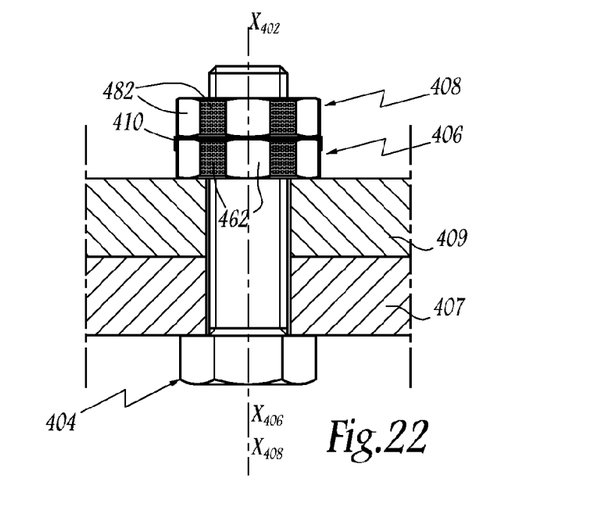
FIG. 22 is a section analogous to FIG. 19, in the tightened configuration of the screw-fastener elements.
Figure 23:
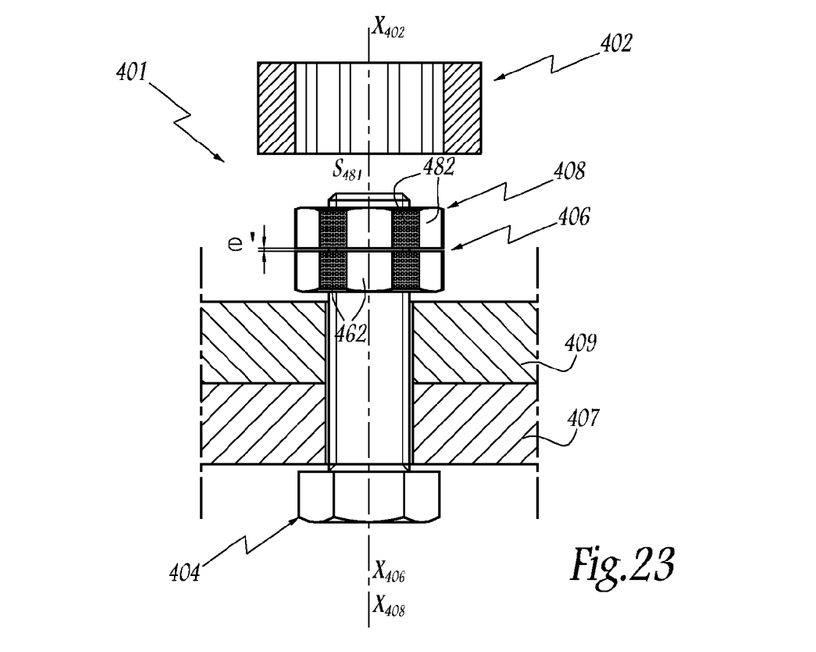
FIG. 23 is a section analogous to FIG. 18 for a fastener and tightening device in accordance with a seventh embodiment of the invention, prior to simultaneous tightening of two screw-fastener elements by means of a tightening member.

In the fifth embodiment shown in FIG. 18, in the sixth embodiment shown in FIGS. 19 to 22, and in the seventh embodiment shown in FIG. 23, elements that are analogous to those of the first embodiment are given identical references plus 400. The device 401 in accordance with these three embodiments comprises a bolt 404, a first nut 406, and a second nut 408 provided as a lock nut. The nuts 406 and 408 are designed to co-operate with the bolt 404 in order to assemble together two parts 407 and 409. These nuts 406 and 408 are two distinct nuts that are substantially identical to each other. In particular, the nuts 406 and 408 have respective external peripheral splines 462 or 482 with the splines 462 of the nut 406 being substantially identical to the splines 482 of the nut 408. As shown in the figures, each of the nuts 406 and 408 is a hexagonal nut.

In a manner analogous to the first embodiment, the device 401 further includes a ring or hoop 402 for tightening the nuts 406 and 408 relative to the bolt 404 in order to assemble together the parts 407 and 409. The tightening ring 402 is suitable for being engaged around the superposed nuts 406 and 408 in order to tighten both of these nuts simultaneously. For this purpose, as in the first embodiment, the tightening ring 402 has internal peripheral splines 422 that are complementary to the external peripheral splines 462 of the nut 406 and 482 of the nut 408. The tightening ring 402 is thus suitable for being engaged on the superposed nuts 406 and 408 by putting the splines 422 of the ring into correspondence with the splines 462 and 482 in alignment of the nuts 406 and 408, the central axes $X_{402}$ of the ring 402 and $X_{406}$, $X_{408}$ of the nuts 406 and 408 then coinciding.

In order to guarantee freedom of the tightening ring 402 engaged relative to the nuts 406 and 408 to move in translation along the direction of the coinciding axes $X_{402}$, $X_{406}$, and $X_{408}$, both before and after tightening, the nuts 406 and 408 are fabricated in such a manner that the splines 462 and 482 are always substantially in angular alignment with one another about the axes $X_{406}$ and $X_{408}$, both before tightening and at the end of tightening. For this purpose, various techniques can be envisaged. Three of them correspond respectively to the fifth, sixth, and seventh embodiments, it being observed that the person skilled in the art is capable of combining and/or modifying the implementation of these three embodiments as a function of the fabrication method used in order to comply with dimensional tolerances and as a function of the assembly method used with the nuts 406 and 408. Before describing the tightening ring 402 in greater detail and how it co-operates mechanically with the nuts 406 and 408, there follows a description of the specific features of the fifth, sixth, and seventh embodiments.

In the embodiment of FIG. 18, the nuts 406 and 408 are fabricated identically or to correspond, e.g. from two blanks that are mounted with prestress on a threaded rod, and then by machining the splines 462 and 482 on each of these blanks, and in alignment with one another. Thus, by way of example, for nuts 406 and 408 of the M12 type, functional dimensional tolerances are typically less than 0.05 millimeters (mm), such that the splines 462 and 482 are in alignment providing they are angularly offset by no more than 10° after the nuts have been tightened by means of the ring 402.

In the embodiment of FIGS. 19 to 22, and in the embodiment of FIG. 23, the nuts 406 and 408 are not mounted in contact with each other as in the embodiment of FIG. 18, but rather at a spacing referenced e in FIGS. 19 to 22 and e' in FIG. 23. This spacing e or e' is made up of a tolerance, plus positive or negative functional clearance, typically less than 0.05 mm for hexagonal M12 type nuts, possibly plus a distance that is equal to, or is a multiple of, the pitch divided by the number of faces of the nuts.

In the embodiment of FIGS. 19 to 22, the spacing e is occupied by a film or a washer 410 that establishes a bridge between the nuts 406 and 408 that are fabricated to be identical or to correspond, the film or washer 410 being made of a plastics material or of a ductile material, preferably forming an adhesive interface with the nuts. The assembly constituted by the nuts 406 and 408, when assembled together by the film or the washer 410, can then be handled as a single part, thereby making the method of tightening the nuts 406 and 408 easier. Advantageously, the value of the spacing e, corresponding to the thickness of the film or of the washer 410, is determined so that the nut 406 is tightened before the lock nut 408, with this applying even in the circumstances shown in FIGS. 20 and 21 where the angular offset between the nut 406 and the lock nut 408, corresponding to the angle referenced β, has the effect of positioning the lock nut 408 upstream from the nut 406 in the conventional screw-fastening direction, with this being because the flexibility of the film or washer 410 maintaining priority for screwing the nut relative to screwing the lock nut. It should be observed that for better visibility the values for the spacing e and for the angle β are exaggerated in the figures.

In the embodiment of FIG. 23, the spacing e' results from material being removed when cutting through an initial single nut in order to fabricate the nut 406 and the lock nut 408. This cutting of a single nut to obtain the two nuts 406 and 408 may be performed by any suitable technique, in particular by means of a cutter tool, a wire, or a beam. Furthermore, the cutting of the initial nut from which the nuts 406 and 408 are fabricated may be performed in full or in part only. If the initial nut is cut in part only, then the nuts 406 and 408 remain assembled together via at least one bridge of material, which bridge is sheared during tightening of the nuts 406 and 408 when they are driven in rotation by interference by means of the tightening ring 402. Thus, fabricating the nut 406 and the lock nut 408 by partially cutting apart a single initial nut enables the nuts 406 and 408 to be handled as a single part, with the nuts 406 and 408 continuing to be connected together by at least one bridge formed by the material of the initial nut and acting for the purpose of connecting the nuts 406 and 408 together in a manner analogous to the film or the washer 410 of the sixth embodiment.

In all of these ways of making the nuts 406 and 408 so that their splines 462 and 482 are in angular alignment about the axes $X_{406}$ and $X_{408}$ before and after tightening, the tightening ring 402 is suitable, from a mutually-engaged configuration of said ring relative to the superposed nuts 406 and 408, for being driven in rotation about its central axis $X_{402}$ so as to tighten the nut 406 simultaneously with or slightly in advance of the tightening of the lock nut 408. An initial turning movement of the tightening ring 402 serves to cause the ring 402 to be held by interference relative to each of the nuts 406 and 408 both axially and in rotation. Starting from this initial held-together configuration, the friction force between the projecting portions $S_{421}$ of the inside peripheral surface $S_{402}$ of the ring and the projecting portions $S_{461}$ of the outside peripheral surface $S_{406}$ of the nut 406 is designed to increase up to a maximum friction force, beyond which there is no longer any friction drive between the projecting surface portions $S_{421}$ and $S_{461}$. The maximum friction force between the projecting portions $S_{421}$ and $S_{461}$ corresponds to a rotary drive torque C transmitted by the tightening ring 402 to the nut 406 starting from the initial held-together configuration that is equal to a predetermined tightening torque $C_0$ for application to the nut 406. Likewise, starting from the initial held-together configuration of the ring 402 and the lock nut 408, the friction force between the projecting portions $S_{421}$ of the inside peripheral surface $S_{402}$ of the ring and the projecting portions $S_{481}$ of the outside peripheral surface $S_{408}$ of the nut 408 is designed to increase up to a maximum friction force, beyond which there is no longer any friction drive between the projecting surface portions $S_{421}$ and $S_{481}$. The maximum friction force between the projecting portions $S_{421}$ and $S_{481}$ corresponds to a rotary drive torque C transmitted by the tightening ring 402 to the nut 408 starting from the initial held-together configuration that is equal to a predetermined tightening torque $C_0'$ for application to the nut 408. Thus, the tightening ring 402 is suitable, starting from the initial held-together configuration, for remaining constrained to turn with the nut 406 or with the nut 408 for a rotary drive torque C that is respectively less than the tightening torque $C_0$ or the tightening torque $C_0'$, and to be released in rotation relative to the nut 406 or the nut 408 for a rotary drive torque C that is respectively equal to the tightening torque $C_0$ or the tightening torque $C_0'$, respectively.

As in the first embodiment, the nut 406 advantageously includes circular ribs (not shown) on its face 464 that is to bear against one of the parts for assembling together, which ribs are centered on the axis $X_{406}$ and seek to limit radial deformation of the nut 406 that is subjected to the radial and axial reactions from the threads of the bolt 404 and from the bearing part 409 during tightening. In order to limit radial deformation of the lock nut 408 during tightening, the nut 408 may also include circular ribs (not shown), on its face 484 that is to bear against the nut 406, which circular ribs are centered on the axis $X_{408}$.

A method of simultaneously tightening the nuts 406 and 408 by means of the tightening ring 402 comprises steps as described below.

Initially, the tightening ring 402 is engaged relative to the superposed nuts 406 and 408 so that the splines 462 and 482 are in angular alignment about the coinciding axes $X_{406}$ and $X_{408}$ by putting the splines 422 into correspondence with the splines 462 and 482. The elements 402, 406, and 408 are then in a mutually-engaged configuration.

From this engaged configuration, turning movement is imparted to the tightening ring 402 about its axis $X_{402}$ in order to reach an initial configuration in which the ring 402 is held both axially and in rotation relative to the nut 406 and the nut 408. The tightening ring 402 is then suitable, on being turned, for transmitting a turning drive torque C to the nuts 406 and 408 in order to tighten them. Turning drive continues to be applied to the tightening ring 402 until reaching a turning drive torque as transmitted by friction between the tightening ring 402 and each of the nuts 406 and 408 that enables the tightening ring 402 to be released to turn relative to each of the nuts 406 and 408. This release of the tightening ring 402 to turn relative to the nuts 406 and 408 is made manifest by the fact that the nuts 406 and 408 become stationary while the tightening ring 402 continues to be turned. The release of the tightening ring 402 allowing it to turn relative to the nut 406 indicates that the predetermined tightening torque $C_0$ has been transmitted to the nut 406, whereas the release of the tightening ring 402 leaving it free to turn relative to the lock nut 408 indicates that the predetermined tightening torque $C_0'$ has been transmitted to the nut 408. Furthermore, specifically for the embodiment of FIGS. 19 to 22, the tightening of the nuts 406 and 408 also serves to shear and flatten the film or washer 410 between the nuts so as to cause the material of the film or the washer to be expelled from the outside peripheral surfaces $S_{406}$ and $S_{408}$ of the two nuts, thereby making it possible visually to verify that the nuts are indeed tightened. Furthermore, during tightening, the film or the washer 410 will also be expelled towards the threads of the nuts 406 and 408 at the interface between the bolt 404 and the nut. Such an injection of material at that interface contributes to preserving the properties of the materials constituting the elements 404, 406, and 408 and to maintaining tightening of the nuts 406 and 408 at their respective torques $C_0$ and $C_0'$, thereby obtaining an anti-loosening effect.

From this configuration where the tightening ring 402 is released to turn, additional turning movement is imparted thereto about its axis $X_{402}$ while the nuts 406 and 408 remain stationary in rotation, until a new mutually-engaged configuration of the ring 402 relative to the nuts 406 and 408 is reached, with the splines 422 once more coinciding with the splines 462 and 482. The tightening ring 402 has then been pivoted relative to the nuts 406 and 408 in such a manner as to put each of its splines 422 into correspondence with the following splines 462 of the nut 406 and 482 of the nut 408 relative to the initial mutually-engaged configuration. In particular, each spline 462 of the nut 406 may, at the end of tightening, be in alignment with a spline 482 of the nut 408 that is different from the spline with which it was in alignment in the engaged configuration of the tightening ring relative to the nuts 406 and 408 prior to tightening.

The tightening ring 402 is then caused to slide axially along the direction of the coinciding axes $X_{402}$, $X_{406}$, and $X_{408}$ relative to the superposed nuts 406 and 408 so as to separate the ring 402 from the nuts. Each of the nuts 406 and 408 is then tightened at its respective predetermined torque $C_0$ or $C_0'$, and the parts 407 and 409 are assembled together.

As can be seen from the above-described examples, the tightening device and method in accordance with the invention serve to guarantee that at least one screw-fastener element 6, 106, 204, 304, 406, 408 is tightened with a predetermined tightening torque $C_0$, $C_0'$. According to the principle of the invention, this tightening torque is transmitted by the tightening member to the or each screw-fastener element by means of co-operation by interference between the peripheral surfaces of these two elements. This co-operation by interference between the peripheral surfaces of the two elements is initiated either by relative turning between the two elements or by relative engagement as a force-fit between corresponding portions of these two elements.

In particularly advantageous manner, the tightening member and the or each screw-fastener element of a device in accordance with the invention are suitable for being released to turn relative to one another, and thus optionally to be separated axially, only when the appropriate tightening torque $C_0$, $C_0'$ has been applied to the screw-fastener element by the tightening member. Any partial stressing of the or each screw-fastener element is thus made impossible, thereby making tightening reliable.

In addition, since the tightening torque $C_0$, $C_0'$ for application to the or each screw-fastener element is imposed mechanically as a result of the characteristics relating to the contacting surfaces of the screw-fastener element and of the tightening member, performance of the tightening method in accordance with the invention does not require action to be taken by a qualified operator. The imposed tightening torque $C_0$, $C_0'$ also makes it possible to avoid any overdimensioning of the screw-fastener element, since the maximum torque that can be applied to the screw-fastener element is the predetermined tightening torque $C_0$, $C_0'$. This predetermined tightening torque is easily adjusted by adapting the coefficient of friction at the interface between the contacting surfaces of the screw-fastener element and of the tightening member, in particular by applying a surface coating, or indeed by varying the profiles of the contacting surfaces, e.g. by providing splines of greater or lesser width.

Furthermore, a tightening device and method in accordance with the invention make it possible to preserve the integrity of the or each screw-fastener element during tightening, such that it is possible to proceed with successive tightening operations on the screw-fastener element. In particular, it is possible to retighten a screw-fastener element for which the tightening force has varied, e.g. as a result of vibration or damage to the material in which it is secured. Furthermore, as can be seen from the above-described examples, the tightening member of a device of the invention may equally well comprise a male tightening portion or a female tightening portion, thereby making it possible to tighten all types of screw-fastener element. In addition, the interference that generates the tightening may act via a conical contact surface, thereby maximizing contact areas, even when tightening screw-fastener elements of small dimensions. Finally, the tightening member in accordance with the invention is of limited manufacturing cost and is easily machined from conventional parts.

The invention is not limited to the examples described and shown. In particular, the tightening member of a device of the invention may have a variety of shapes, in particular shapes that are different from those described above. By way of example, the tightening rings 2, 102, and 402 may be replaced by a bushing presenting inside machining analogous to that of the rings 2 and 102. In addition, each of the tightening members described above is designed to be turned by an external tool independently of the tightening member. In a variant, a tightening member in accordance with the invention may form part of a tool, i.e. it may constitute a portion thereof, e.g. the socket of a wrench.

As shown in FIGS. 1 to 9, 12 and 18 to 23, it is also emphasized at this point that the rings or hoops 2, 102, and 402 that include peripheral splines and the corresponding screw-fastener elements 6, 106, 406, and 408 are in contact via six suitable surfaces. In practice, the necessary and sufficient number of contact surfaces between the male or female driver parts and the female or male driven parts is advantageously selected application by application.

Furthermore, providing splines at the interference interface between the tightening member and the screw-fastener element for tightening is not reserved to a tightening member of the female type, and may be transposed to the third and fourth embodiments. In addition, means for checking the tightening force delivered by the screw-fastener element after it has been tightened by means of a device of the invention, and as described in the first embodiment, may also be provided in any device in accordance with the invention that makes use of a contact surface 64, 164, 264, or 464 between the screw-fastener element and a part for tightening by means of the screw-fastener element.

Furthermore, a tightening device and method of the invention may be used for tightening any type of screw-fastener element, e.g. for tightening a wood screw, a sheet metal screw, nuts, etc. A tightening device and method of the invention may also be used for tightening a screw-fastener element that is held stationary relative to an intermediate part, it then being possible for the tightening member to be designed to co-operate by interference with said intermediate part, which should be considered as forming a single piece with the screw-fastener element. The provision of such an intermediate part that is prevented from moving relative to the screw-fastener element makes it easy to implement a tightening device and method of the invention with a standard screw-fastener element.

Finally, the above-described examples of simultaneously tightening two nuts by interference by means of one tightening ring may be transposed to tightening some arbitrary number of nuts greater than two. In addition, when simultaneously tightening a nut and lock nut, the two nuts may present dimensions that are different from each other. In particular, in order to enhance tightening of one nut relative to the other nut, provision may be made for the nuts to have heights along the direction of the central axes of the nuts that differ from one nut to the other. The nut and the lock nut may also present diameters that are different, the inside profile of the tightening ring then being adapted to enable both nuts to be driven simultaneously for tightening purposes. This variant has the advantage of making it possible, at will, to perform simultaneous tightening and checking or else to perform tightening and checking that are different for the nut and for the lock nut.

The invention claimed is:

1. A combination comprising a tightening member and at least one screw-fastener element, which combination is adapted for securing the at least one screw-fastener element to a mating fastener element with a predetermined tightening torque, the at least one screw-fastener element having a continuous engaging surface that extends continuously along a complete periphery of the at least one screw-fastener element and the tightening member having a corresponding continuous engaging surface that extends continuously along a corresponding complete periphery of the tightening member such that the tightening member is held both axially and in rotation relative to the screw-fastener element by tight-fit surface interference of the continuous engaging surfaces of the tightening member and the at least one screw-fastener element and such that the tightening member and the at least one screw-fastener element rotate with one another as continuously increasing torque is applied to the tightening member which is less than the predetermined torque, the continuous engaging surface of the tightening member including at least one peripheral spline complementary to at least one peripheral spline of the engaging surface of the at least one screw-fastener element, a projecting surface portion of the at least one peripheral spline of the tightening member being in tight-fit surface interference with a projecting surface portion of the at least one peripheral spline of the engaging surface of the at least one screw-fastener element when the tightening member and the at least one screw-fastener element rotate together, wherein the tightening member and the at least one screw-fastener element rotate relative to each other when a torque transmitted by the tightening member to the at least one screw-fastener element reaches the predetermined tightening torque and without destruction of the tightening member, whereby at the predetermined tightening torque, there is a maximum friction force between the projecting surface portion of the at least one peripheral spline of the continuous engaging surface of the tightening member and the at least one screw-fastener element beyond which there is no longer friction drive force between the continuous engaging surfaces of the tightening member and of the at least one screw-fastener element.

2. The combination according to claim 1 including at least first and second screw-fastener elements with respective predetermined tightening torques, the tightening member being held both axially and in rotation relative both to the first screw-fastener element and to the second screw-fastener element by tight-fit surface interference of the continuous engaging surface of the tightening member and respective continuous engaging surfaces of the first and second screw-fastener elements such that the tightening member and the first and second screw-fastener elements rotate with one another when rotational torque is applied to the tightening member which is less than the predetermined torque of both of the first and second screw-fastener elements in order to tighten the first and second screw-fastener elements substantially simultaneously, and wherein the tightening member and the first screw-fastener element rotate relative to each other when a turning drive torque transmitted by the tightening member to the first screw-fastener element is equal to the predetermined tightening torque of the first screw-fastener element, and wherein the tightening member and the second screw-fastener element rotate relative to each other when a turning drive torque transmitted by the tightening member to the second screw-fastener element is equal to the predetermined tightening torque of the second screw-fastener element.

3. The combination according to claim 1, wherein the continuous engaging surfaces of the tightening member and of the at least one screw-fastener element are conical surfaces.

4. The combination according to claim 1, wherein the continuous engaging surfaces of the tightening member and of the at least one screw-fastener element are provided with a surface coating.

5. The combination according to claim 1, wherein the continuous engaging surface of the tightening member is one of a male or female portion for co-operating respectively with one of a female or male portion of the continuous engaging surface of the screw-fastener element.

6. The combination according to claim 2, wherein the first and second screw-fastener elements are assembled to each other by at least one bridge that is positioned between the first and second screw-fastener elements.

7. The combination according to claim 1, including means for limiting a radial deformation of the at least one screw-fastener element that is induced during tightening by the tightening member.

8. The combination according to claim 1, including means for checking a tightening force delivered by the at least one screw-fastener element at the end of tightening by the tightening member by evaluating a radial deformation of the screw-fastener element.

9. A device according to claim 1, the device further comprises an intermediate part that is held relative to the screw-fastener element, the tightening member being suitable for turning the intermediate part in order to tighten the screw-fastener element.

10. The combination according to claim 2, wherein the first and second screw-fastener elements are assembled to each other by at least one bridge that is formed integrally with the first and second screw-fastener elements.

11. The combination according to claim 1, wherein the projecting surface portion of the at least one peripheral spline of the continuous engaging surface of the tightening member and the projecting surface of the at least one peripheral spline of the continuous engaging surface of the at least one screw-fastener element are in tangential contact as the tightening member and the at least one screw-fastener element rotate with one another as continuously increasing torque is applied to the tightening member which is less than the predetermined torque.

12. The combination according to claim 1, wherein contact area between the tightening member and the at least one screw-fastener element varies as continuously increasing torque is applied to the tightening member, whereby prior to the application of torque to the tightening member, the contact area is zero, as continuously increasing torque is applied to the tightening member until the torque applied by the tightening member to the at least one screw-fastener element reaches the predetermined tightening torque, the contact area increases, and after the torque applied by the tightening member to the at least one screw-fastener element reaches the predetermined tightening torque, the contact area becomes zero.

* * * * *